United States Patent [19]

Joyce

[11] Patent Number: 5,679,000
[45] Date of Patent: Oct. 21, 1997

[54] BOARD GAME RELATING TO KNOWLEDGE OF DIFFERENT CULTURES OF PEOPLE

[76] Inventor: William S. Joyce, 84 Somerset St., Somerville, N.J. 08876

[21] Appl. No.: 578,020

[22] Filed: Dec. 26, 1995

[51] Int. Cl.$^6$ ................................................ G09B 19/22
[52] U.S. Cl. ................................ 434/128; 273/248
[58] Field of Search ........................ 273/236, 252, 273/254, 248, 431, 430, 242, 243; 434/128, 154

[56] References Cited

U.S. PATENT DOCUMENTS

| | | | |
|---|---|---|---|
| 4,093,235 | 6/1978 | Barry | 273/254 |
| 4,561,658 | 12/1985 | Peterson | 434/348 X |
| 4,934,708 | 6/1990 | Kolkind | 273/248 X |
| 5,405,150 | 4/1995 | Loder | 434/128 X |

FOREIGN PATENT DOCUMENTS

| | | | |
|---|---|---|---|
| 2066820 | 10/1993 | Canada | 273/252 |
| 1604561 | 12/1981 | United Kingdom | 273/254 |

*Primary Examiner*—Jeffrey A. Smith

[57] ABSTRACT

A board game relating to knowledge of different cultures of people comprising a plurality of game pieces with each piece representing a player; a planar game board having an upper surface, a peripheral edge portion, and indicia on the upper surface defining a plurality of home spaces, and a plurality of traveling spaces that are interconnected with the home spaces to create a continuous traveling path upon which the game pieces move during play of a game; a pair of dice for controlling movement of the game pieces; a first deck of game cards with each card bearing a question thereon related to a specific culture of people, and wherein one of the cards of is drawn when one of the player's game pieces is placed upon one of the traveling spaces; and a second deck of game cards with each card bearing a question thereon related to a specific culture of people, and wherein one of the cards is selected by one of the players when that player begins the game and wherein another card is selected by this same player in an attempt to conclude the game; and an instruction booklet setting forth the rules of the game.

1 Claim, 2 Drawing Sheets

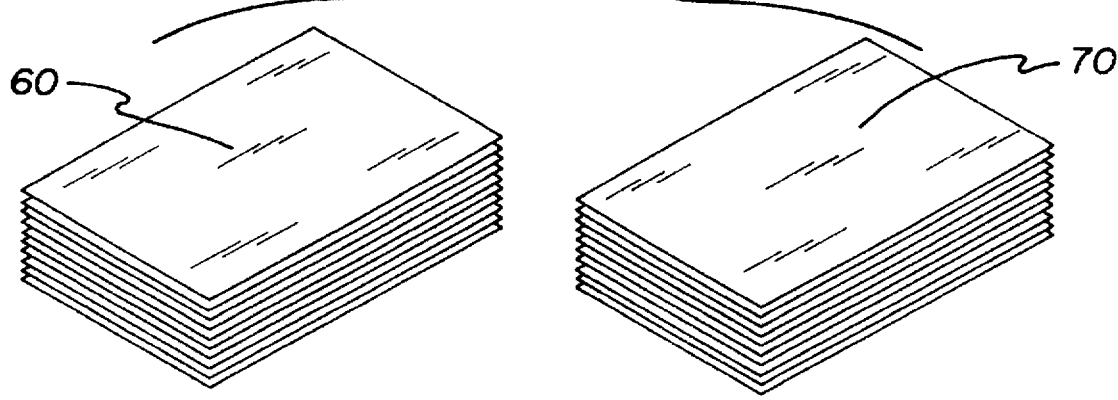
FIG. 2
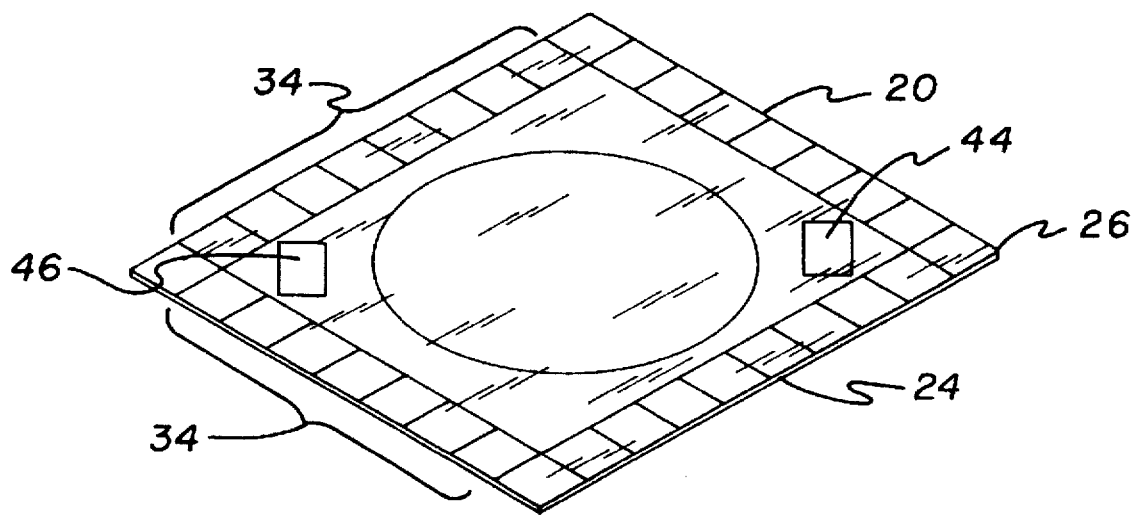
FIG. 3
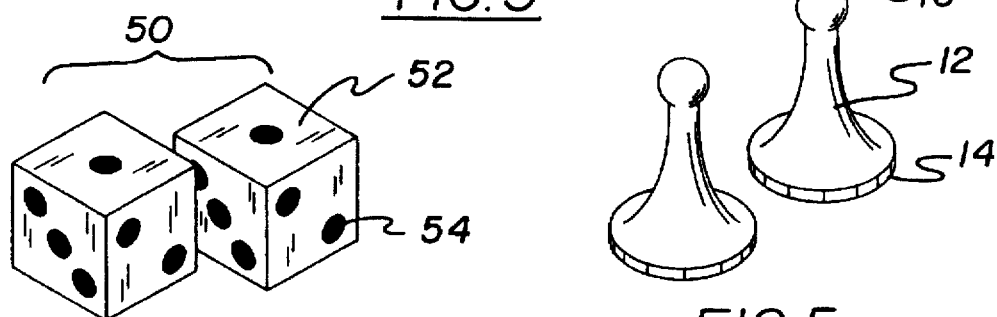
FIG. 4
FIG. 5

1

BOARD GAME RELATING TO KNOWLEDGE OF DIFFERENT CULTURES OF PEOPLE

BACKGROUND OF THE INVENTION

1. Field of the Invention

The present invention relates to a board game relating to knowledge of different cultures of people and more particularly pertains to allowing opposing players to compete against each other and test their knowledge of different cultures of people with a board game relating to knowledge of different cultures of people.

2. Description of the Prior Art

The use of board games is known in the prior art. More specifically, board games heretofore devised and utilized for the purpose of allowing opposing players to compete against each other and test their cultural knowledge are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,085,439 to Lott discloses a game board, query cards and method of playing a black history game. U.S. Pat. No. 5,183,258 to Lerke discloses a map reading game apparatus. U.S. Pat. No. 5,257,939 to Robinson et al discloses a cultural knowledge board game. U.S. Pat. No. 5,292,133 to Alexander discloses a geographic cultural and economic board game.

While these devices fulfill their respective, particular objective and requirements, the aforementioned patents do not describe a board game relating to knowledge of different cultures of people that allows opposing players to compete against each other and test their knowledge of different cultures.

In this respect, the board game relating to knowledge of different cultures of people according to the present invention substantially departs from the conventional concepts and designs of the prior art, and in doing so provides an apparatus primarily developed for the purpose of allowing opposing players to compete against each other and test their knowledge of different cultures of people.

Therefore, it can be appreciated that there exists a continuing need for new and improved board game relating to knowledge of different cultures of people which can be used for allowing opposing players to compete against each other and test their knowledge of different cultures of people. In this regard, the present invention substantially fulfills this need.

SUMMARY OF THE INVENTION

In the view of the foregoing disadvantages inherent in the known types of board games now present in the prior art, the present invention provides an improved board game relating to knowledge of different cultures of people. As such, the general purpose of the present invention, which will be described subsequently in greater detail, is to provide a new and improved board game relating to knowledge of different cultures of people and method which has all the advantages of the prior art and none of the disadvantages.

To attain this, the present invention essentially comprises, in combination, a plurality of game pieces. Each piece represents a player. A rectangular planar game board is included and has an upper surface, a peripheral edge portion, a center, and indicia on the upper surface. The indica on the upper surface defines four home spaces that are separately positioned at each corner of the game board, a plurality of traveling spaces arranged in four linear sequences that are interconnected with the home spaces to create a rectangular and continuous traveling path upon which the game pieces move during play of a game, a plan view of earth aligned about the center and enclosed by the traveling path, a circular depiction of hands positioned upon the plan view of earth with each hand representing a different culture and with hands extending radially inwards toward the center to define a symbol of unity, a first rectangular holding space positioned between the plan view of earth and one of the home spaces, and a second holding space positioned between the plan view of earth and another of the home spaces and with the holding spaces and the plan view of earth being aligned about a common diagonal axis.

A pair of cube-shaped dice is included. Each die has six faces. The faces of each die bearing dotted indicia from one to six, respectively. A roll of the dice upon the game board controls movement of the game pieces around the traveling path beginning at the respective player's home space and then ending at the respective player's home space.

A first deck and a second deck of game cards are provided. The first deck of game cards is positionable in a stacked sequence upon the first holding space. Each card of the first deck bears a question thereon related to a specific culture of people. One of the cards of the first deck is drawn when one of the player's game pieces is placed upon one of the traveling spaces. The second deck of game cards is positionable in a stacked sequence upon the second holding space. Each card of the second deck bears a question thereon related to a specific culture of people. The questions on the cards of the second deck are of greater difficulty than those on the cards of the first deck. One of the cards of the second deck is selected by one of the players when that player begins the game, and another card is selected by this same player in an attempt to conclude the game. The game piece of a given player maintains its current position upon the game board when this player correctly answers a question from one of the decks. The game piece of this same player is moved backwards a number of spaces as indicated by the dice when the question is incorrectly answered. Lastly, an instruction booklet setting forth the rules of the game is included.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved board game relating to knowledge of different cultures of people which has all the advantages of the prior art board games and none of the disadvantages.

It is another object of the present invention to provide a new and improved board game relating to knowledge of different cultures of people which may be easily and efficiently manufactured and marketed.

It is a further object of the present invention to provide a new and improved board game relating to knowledge of different cultures of people which is of durable and reliable construction.

An even further object of the present invention is to provide a new and improved board game relating to knowledge of different cultures of people which is susceptible of a low cost of manufacture with regard to both materials and labor, and which accordingly is then susceptible of low prices of sale to the consuming public, thereby making such a board game relating to knowledge of different cultures of people economically available to the buying public.

Still yet another object of the present invention is to provide a new and improved board game relating to knowledge of different cultures of people which provides in the apparatuses and methods of the prior art some of the advantages thereof, while simultaneously overcoming some of the disadvantages normally associated therewith.

Even still another object of the present invention is to provide a new and improved board game relating to knowledge of different cultures of people for allowing opposing players to compete against each other and test their knowledge of different cultures of people.

Lastly, it is an object of the present invention to provide a new and improved board game relating to knowledge of different cultures of people comprising a plurality of game pieces with each piece representing a player; a planar game board having an upper surface, a peripheral edge portion, and indicia on the upper surface defining a plurality of home spaces, and a plurality of traveling spaces that are interconnected with the home spaces to create a continuous traveling path upon which the game pieces move during play of a game; a pair of dice, and with a roll of the dice controlling movement of the game pieces around the traveling path beginning at the respective player's home space and then ending at the respective player's home space; a first deck of game cards with each card bearing a question thereon related to a specific culture of people, and wherein one of the cards is drawn when one of the player's game pieces is placed upon one of the traveling spaces; and a second deck of game cards with each card bearing a question thereon related to a specific culture of people, and wherein one of the cards is selected by one of the players when that player begins the game and wherein another card is selected by this same player in an attempt to conclude the game; and an instruction booklet setting forth the rules of the game.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a perspective view of the decks of cards of the present invention.

FIG. 3 is a perspective view of the game board of the present invention.

FIG. 4 is a perspective view of the pair of dice of the present invention.

FIG. 5 is a perspective view of the game pieces of the present invention.

The same reference numerals refer to the same parts through the various Figures.

DESCRIPTION OF THE PREFERRED EMBODIMENT

Figure 1:
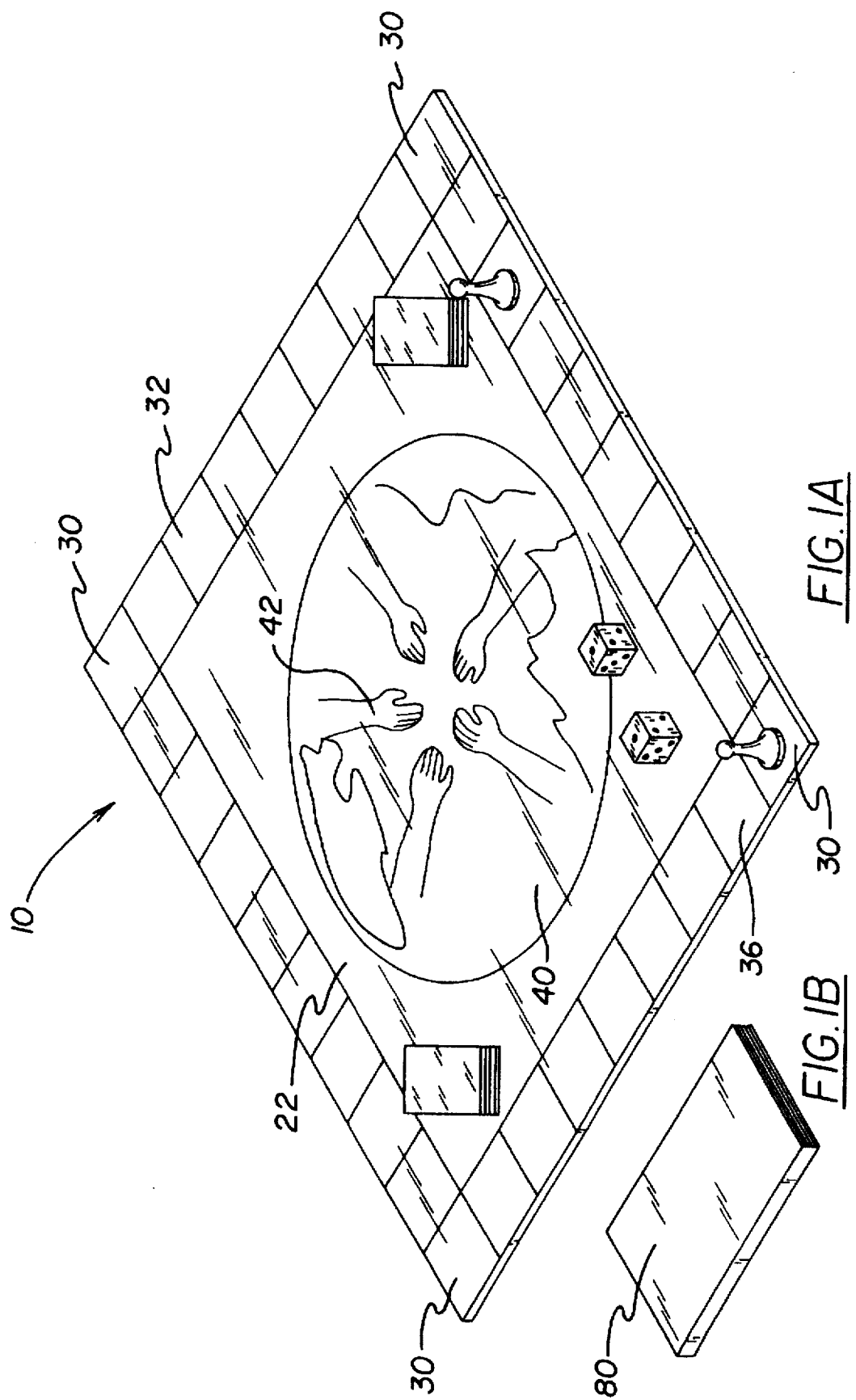
FIG. 1A is a perspective view of the game board, decks of cards, dice, and game pieces of the present invention.
FIG. 1B is a perspective view of the instruction booklet of the present invention.

With reference now to the drawings, and in particular, to FIG. 1 thereof, the preferred embodiment of the new and improved board game relating to knowledge of different cultures of people embodying the principles and concepts of the present invention and generally designated by the reference number 10 will be described.

The preferred embodiment of the present invention comprises a plurality of components in their broadest context, such components include a set of game pieces, game board, dice, game cards, and instruction booklet. Such components are individually configured and correlated with respect to each other to allow opposing players to compete against each other in a game to test their knowledge of different cultures of people.

Specifically, the present invention includes a plurality of rigid plastic game pieces 12. Each game piece represents a player. Each game piece has a lower extent 14 of a frustroconical configuration tapering upwards to a rounded upper extent 16. The game pieces are preferably of different colors.

The game pieces move upon a rectangular, planar, and foldable game board 20. The game board has an upper surface 22, a peripheral edge portion 24, a center, and four corners 26. The game board bears indicia on its upper surface. The indicia define four rectangular home spaces 30. The home spaces are separately positioned at each corner of the game board. Each home space is colored to correspond with a separate game piece. A game piece is positioned on the home space to start the game and again positioned on the home space to end the game. Indicia on the surface also define a plurality of rectangular traveling spaces 32. The traveling spaces are arranged in four straight and linear sequences 34. The linear sequences are interconnected with the home spaces 30 to create a rectangular and continuous traveling path 36 upon which the game pieces 12 move during a play of a game. In addition, the indicia define a plan view of Earth 40. The plan view is aligned about the center of the game board and enclosed by the traveling path 36. Furthermore, a circular depiction of human hands 42 is positioned upon the plan view of Earth 40. Each hand of the depiction represents a different culture. The hands extend radially inwards toward the center of the game board in a gesture that defines a symbol of unity. Lastly, the indicia define a pair of holding spaces. A first rectangular holding space 44 is positioned between the plan view of Earth 40 and one of the home spaces 30. A second holding space 46 is positioned between the plan view of Earth 40 and another of the home spaces. The holding spaces and the plan view of Earth are aligned about a common diagonal axis.

A pair of cube-shaped rigid plastic dice 50 is provided. Each die has six faces 52. The faces of each die bear dotted indicia 54 from one to six, respectively. A roll of the pair of dice upon the game board controls movement of a game piece on and around the traveling path in a clockwise fashion beginning at the respective player's home space and then ending at the same respective player's home space. Each player in turn rolls the dice upon the game board and moves an associated game piece about the traveling path during the course of the game. A game of play can commence in a conventional manner, such as letting a player who has a high roll of the dice begin the game and then allowing turns of play to be taken by the other players in a clockwise fashion as referenced with respect to their relative position around the game board.

Also included are a first deck of game cards 60 and a second deck of game cards 70. The first deck 60 is positioned in a stacked sequence upon the first holding space 44. Each card of the first deck bears a question thereon related to a specific culture of people. One of the cards of the first deck is drawn when one of the player's game pieces is placed upon one of the traveling spaces during play. The second deck of game cards 70 is positionable in a stacked sequence upon the second holding space 46. Each card of the second deck bears a question thereon related to a specific culture of people, and each question is of greater difficulty than those on the cards of the first deck. One of the cards of the second deck is selected by one of the players when that particular player's game piece is positioned on a home space. Thus, each player has to initially answer a question on the card of the second deck to start the game and then end the game by correctly answering another question on another card of the second deck. Note that the player must attain a roll of the dice that exactly matches the number spaces to the final home space is order to move his piece to the home space. The game piece of one of players maintains its current position upon the game board when this player correctly answers a question from one of the decks. The game piece of this same player is moved backwards a number of spaces indicated by his current roll of the die when the question is incorrectly answered. The player's game piece is moved back no further than to his respective home space-where this player initially started the game. Lastly, an instruction book 80 is provided. The instruction book sets forth the rules of the game as previously described.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A board game relating to knowledge of different cultures of people for allowing opposing players to compete against each other and test their knowledge of different cultures of people comprising, in combination:

a plurality of game pieces with each piece representing a player;

a rectangular planar game board having an upper surface, a peripheral edge portion, a center, and indicia on the upper surface defining four home spaces that are separately positioned at each corner of the game board, a plurality of traveling spaces arranged in four linear sequences that are interconnected with the home spaces to create a rectangular and continuous traveling path upon which the game pieces move during play of a game, a circular depiction of hands positioned upon the plan view of earth with each hand representing a different culture and with hands extending radially inwards toward the center to define a symbol of unity, a first rectangular holding space positioned between the plan view of earth and one of the home spaces, and a second holding space positioned between the plan view of earth and another of the home spaces and with the holding spaces and the plan view of earth being aligned about a common diagonal axis;

a pair of cube-shaped dice each having six faces with the faces bearing dotted indicia from one to six, respectively, and with a roll of the dice upon the game board controlling movement of the game pieces around the traveling path beginning at the respective player's home space and then ending at the respective player's home space;

a first deck of game cards positionable in a stacked sequence upon the first holding space and with each card bearing a question thereon related to a specific culture of people selected from around the world, and wherein one of the cards is drawn when one on the player's game pieces is placed upon one of the traveling spaces; and a second deck of game cards positionable in a stacked sequence upon the second holding space and with each card bearing a question thereon related to a specific culture of people selected from around the world and wherein each question is of greater difficulty than those on the first cards of the first deck, and wherein one of the cards is selected by one of the players when that player begins the game and wherein another card is selected by this same player in an attempt to conclude the game, and wherein the game piece of one of the players maintains its current position upon the game board when this player correctly answers a question from one of the decks and wherein the game piece of this same player is moved backwards a number of spaces indicated by the dice when the question is incorrectly answered; and an instruction booklet setting forth the rules of the game.

* * * * *